US009800966B2

(12) United States Patent
Hirsch et al.

(10) Patent No.: US 9,800,966 B2
(45) Date of Patent: Oct. 24, 2017

(54) SMART CASE POWER UTILIZATION CONTROL SYSTEM AND METHOD

(71) Applicant: BRAGI GmbH, München (DE)

(72) Inventors: Eric Christian Hirsch, München (DE); Marius Knothe, München (DE); Peter Vincent Boesen, München (DE)

(*) Notice: Subject to any disclaimer, the term of this patent is extended or adjusted under 35 U.S.C. 154(b) by 0 days.

(21) Appl. No.: 15/245,036

(22) Filed: Aug. 23, 2016

(65) Prior Publication Data

US 2017/0064429 A1 Mar. 2, 2017

Related U.S. Application Data

(60) Provisional application No. 62/211,768, filed on Aug. 29, 2015.

(51) Int. Cl.
| | |
|---|---|
| *H04R 1/10* | (2006.01) |
| *H02J 5/00* | (2016.01) |
| *H04B 1/3827* | (2015.01) |
| *H04M 1/05* | (2006.01) |
| *H04M 1/60* | (2006.01) |
| *H04W 52/02* | (2009.01) |
| *H04B 1/3888* | (2015.01) |

(52) U.S. Cl.
CPC ............ *H04R 1/1025* (2013.01); *H02J 5/005* (2013.01); *H04B 1/385* (2013.01); *H04M 1/05* (2013.01); *H04M 1/6066* (2013.01); *H04W 52/0209* (2013.01); *H04W 52/0254* (2013.01); *H04B 1/3888* (2013.01); *H04B 2001/3866* (2013.01); *H04R 2420/07* (2013.01); *H04R 2460/03* (2013.01); *H04W 52/028* (2013.01); *Y02B 60/50* (2013.01)

(58) Field of Classification Search
CPC . H04R 2460/03; H04R 2420/07; H02J 5/005; H04M 1/05; H04M 1/6066; H04W 52/0254; H04W 52/028; H04B 1/385; H04B 2001/3866; H04B 1/3888
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |

(Continued)

FOREIGN PATENT DOCUMENTS

| | | |
|---|---|---|
| EP | 1017252 A2 | 7/2000 |
| EP | 2903186 A1 | 8/2015 |

(Continued)

OTHER PUBLICATIONS

Announcing the $3,333,333 Stretch Goal (Feb. 24, 2014).

(Continued)

*Primary Examiner* — Brenda Bernardi
(74) *Attorney, Agent, or Firm* — Goodhue, Coleman & Owens, P.C.

(57) ABSTRACT

A system, method, and smart case for managing wireless earpieces. The wireless earpieces are detected proximate the smart case. The power utilized by the wireless earpieces is lowered in response to detecting the wireless earpieces proximate the smart case. The wireless earpieces are charged utilizing a battery of the smart case in response to determining the wireless earpieces require charging.

19 Claims, 5 Drawing Sheets

(56) References Cited

U.S. PATENT DOCUMENTS

| | | |
|---|---|---|
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,825,626 B2* | 11/2010 | Kozisek ............... H04M 1/0258 320/114 |
| 7,983,628 B2 | 7/2011 | Boesen |
| 8,140,357 B1 | 3/2012 | Boesen |
| 8,891,800 B1* | 11/2014 | Shaffer ................ H04R 1/1025 379/437 |
| 9,013,145 B2* | 4/2015 | Castillo ................ H02J 7/0044 320/103 |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1* | 7/2006 | Van Engelen ...... H04M 1/6033 455/575.2 |
| 2006/0258412 A1* | 11/2006 | Liu ........................ H02J 7/0044 455/575.2 |
| 2008/0090622 A1* | 4/2008 | Kim ....................... H02J 7/0044 455/573 |
| 2008/0254780 A1 | 10/2008 | Kuhl et al. |
| 2008/0298606 A1* | 12/2008 | Johnson ............... H04R 1/1091 381/74 |
| 2009/0017881 A1 | 1/2009 | Madrigal |
| 2009/0296968 A1* | 12/2009 | Wu ........................ H04R 25/00 381/323 |
| 2010/0320961 A1 | 12/2010 | Castillo et al. |
| 2011/0286615 A1 | 11/2011 | Olodort et al. |
| 2014/0270227 A1 | 9/2014 | Swanson |
| 2015/0245127 A1* | 8/2015 | Shaffer ................ H04R 1/1025 381/380 |
| 2016/0073189 A1* | 3/2016 | Linden ................. H04R 1/1025 381/74 |

FOREIGN PATENT DOCUMENTS

| | | |
|---|---|---|
| GB | 2074817 | 4/1981 |
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).

(56) References Cited

OTHER PUBLICATIONS

BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + the Charging Case & the BRAGI News (Feb. 21, 2014).
The Dash—A Word From Our Software, Mechanical and Acoustics Team + an Update (Mar. 11, 2014).
Update From BRAGI—$3,000,000—Yipee (Mar. 22, 2014).
International Search Report and Written Opinion, PCT/EP2016/070246 (dated Dec. 19, 2016).

\* cited by examiner

SMART CASE POWER UTILIZATION CONTROL SYSTEM AND METHOD

PRIORITY STATEMENT

This application claims priority to U.S. Provisional Patent Application No. 62/211,768, filed Aug. 29, 2015, hereby incorporated by reference in its entirety.

BACKGROUND

I. Field of the Disclosure

The present invention relates to wireless electronics and battery systems. More specifically, but not exclusively, the present invention relates to a smart case for power management and utilization of wireless earpieces.

II. Description of the Art

The growth and utilization of wearable devices is increasing exponentially. The growth is fostered by the decreasing sizes of microprocessors, circuit boards, chips, and other electronic components. Wearable devices are necessarily dependent upon their batteries in order to complete their desired function. If the battery life is poor, the user interface and user experience suffers as excessive time and attention are required for retrieving the wearable device and recharging, or replacing the battery. Because the battery size and capacity is limited for most wearables, close management of the onboard power supply system may become very important.

SUMMARY OF THE DISCLOSURE

The illustrative embodiments provide a system, method, and smart case for managing wireless earpieces. The wireless earpieces are detected proximate the smart case. The power utilized by the wireless earpieces is lowered in response to detecting the wireless earpieces proximate the smart case. The wireless earpieces are charged utilizing a battery of the smart case in response to determining the wireless earpieces require charging. In another embodiment, the smart case includes a processor and a memory for storing a set of instructions that are executed to perform the above described method and process.

Another embodiment provides a smart case for wireless earpieces. The smart case includes a frame for securing the wireless earpieces. A logic engine controls the functionality of the smart case. A first interface electrically interfaces the wireless earpieces with the smart case. A battery controlled by the logic engine charges the wireless earpieces in response to contact with the first interface. A second interface charging the battery. The logic engine instructs the wireless earpieces to enter a low power mode in response to the wireless earpieces communicating with the first interface.

According to one aspect, a method for managing wireless earpieces utilizing a smart case includes detecting the wireless earpieces proximate the smart case, lowering power utilized by the wireless earpieces for a low power mode in response to detecting the wireless earpieces proximate the smart case, and charging the wireless earpieces utilizing a battery of the smart case in response to determining the wireless earpieces require charging. The method may further include downloading data gathered by sensors of the wireless earpieces for storage in a memory of the smart case. The method may further include synchronizing data gathered by the wireless earpieces with a memory of the smart case. The method may further include communicating the data from the smart case to an external device in response to connecting the external device to the smart case. The detecting may be performed by a near field communication between the smart case and the wireless earpieces. The detecting may further include sensing an electrical interface between the wireless earpieces and the smart case. The charging may include charging the wireless earpieces to a threshold level. The method may further include providing at least a visual indicator in response to the battery of the smart case dropping below a minimum threshold value. The method may further include the step of recharging the wireless earpieces in response to the wireless earpieces remaining in the smart case for a threshold time period to condition and manage battery life of the batteries of the wireless earpieces. The smart case may include a display for displaying information corresponding to the smart case and the wireless earpieces. The information may include at least a battery status of the smart case and the wireless earpieces. The display may be one or more of touch sensitive, bendable, foldable, and/or transparent display. The wireless earpieces may be charged and synchronize data in the low power mode. The method may further include entering the low power mode in response to not detecting the wireless earpieces proximate the smart case. The charging may be performed using inductive charging. The method may further include modifying the performance of the wireless earpieces utilizing the smart case.

According to another aspect a smart case for wireless earpieces includes a frame securing the wireless earpieces, a logic engine controlling the functionality of the smart case, a first interface electrically interfacing the wireless earpieces with the smart case, a battery controlled by the logic engine charging the wireless earpieces in response to contact with the first interface, and a second interface charging the battery, wherein the logic engine commands the wireless earpieces to enter a low power mode in response to the wireless earpieces contacting the first interface. The smart case may of any number of sizes and shapes including a clamshell design, a cylindrical tube, or of other geometries. The smart case may include a transceiver communicating with the wireless earpieces. The wireless earpieces may communicate with one or More external devices through an Internet connection established by the transceiver. The transceiver may command the wireless earpieces to enter the low power mode in response to detecting the wireless earpieces is within a threshold distance of the smart case. The smart case may enters the low power mode in response to 1) detecting the wireless earpieces are not proximate the smart case, or 2) the wireless earpieces are charged and applicable data is synchronized. The transceiver may communicate with one or more external devices to communicate at least status and data received from the wireless earpieces. The smart case may further include a memory in communication with the logic engine storing user data gathered by the wireless earpieces. The logic engine may implement the low power mode in response to detecting inactivity of the smart case and wireless earpieces for a threshold time period. The smart case may include a display for displaying information corresponding to the smart case and the wireless earpieces. The information may include at least a battery status of the smart case and the wireless earpieces. The display may be one or more of touch sensitive, bendable, foldable, and transparent. The wireless earpieces may charge and synchronize data in the low power mode. The second interface may be an inductive charger. The logic engine may control tuning of the performance of the wireless earpieces utilizing the smart case.

According to another aspect, a smart case for a wireless earpiece includes a processor for executing a set of instructions and a memory for storing the set of instructions, wherein the set of instructions are executed to: detect the wireless earpieces proximate the smart case; lower power utilized by the wireless earpieces to a low power mode in response to detecting the wireless earpieces proximate the smart case; and charge the wireless earpieces utilizing a battery of the smart case in response to determining the wireless earpieces require charging. The set of instructions may be further executed to download data gathered by the wireless earpieces for storage in a memory of the smart case. The wireless earpieces may be charged to a threshold level by the smart case, wherein the smart case conditions batteries of the wireless earpieces to maximize longevity. The set of instructions may be further executed to recharge the wireless earpieces in response to the wireless earpieces remaining in the smart case for a threshold time period. The set of instructions may be further executed to communicate data from the smart case to an external device in response to authorization of the external device. The smart case may further include an interface for displaying information to a user and receiving selections from the user. The set of instructions may be further executed to charge the wireless earpieces and synchronize data in the low power mode. The charging may be performed inductively or through a physical connection. The set of instructions may be further executed to modify the performance of the wireless earpieces based on the user characteristics and a user environment. The set of instructions may be further executed to establish an Internet connection with one or more remote devices for synchronizing data with the wireless earpieces. The set of instructions may be further executed to execute a low power mode for the smart case in response to 1) detecting the wireless earpieces are not proximate the smart case, or 2) the wireless earpieces are charged and applicable data is synchronized.

BRIEF DESCRIPTION OF THE DRAWINGS

Illustrated embodiments oldie present invention are described in detail below with reference to the attached drawing figures, which are incorporated by reference herein, and where.

DETAILED DESCRIPTION OF THE DISCLOSURE

The illustrative embodiments provide a system, method, and smart case device for managing and controlling wireless devices, such as wireless earpieces. The smart case may be utilized to preserve the life cycle of the wireless earpieces. The smart case may help preserve battery life by shutting down the wireless earpieces while not in use. In addition, the smart cases may ensure that the wireless earpieces are charged to a desired level. Charging may be performed utilizing direct contact (e.g., hardware connectors/ports, contacts, etc.) or wirelessly (e.g., inductive charging). The smart case may communicate with the wireless earpieces through physical interactions (e.g., contact points, physical switches, etc.) or through wireless connections, standards, or protocols (e.g., near field communications, Bluetooth, Wi-Fi, ANT+, etc.). The smart case may also download, synchronize, or store biometric and performance data associated with the wireless earpieces and/or associated user. The smart case may utilize a low power mode to ensure that battery life is preserved through charging. The smart case may also modify or tune the wireless earpieces to maximize performance utilizing software adjustments, updates, or cleaning of the wireless earpieces.

Figure 1:
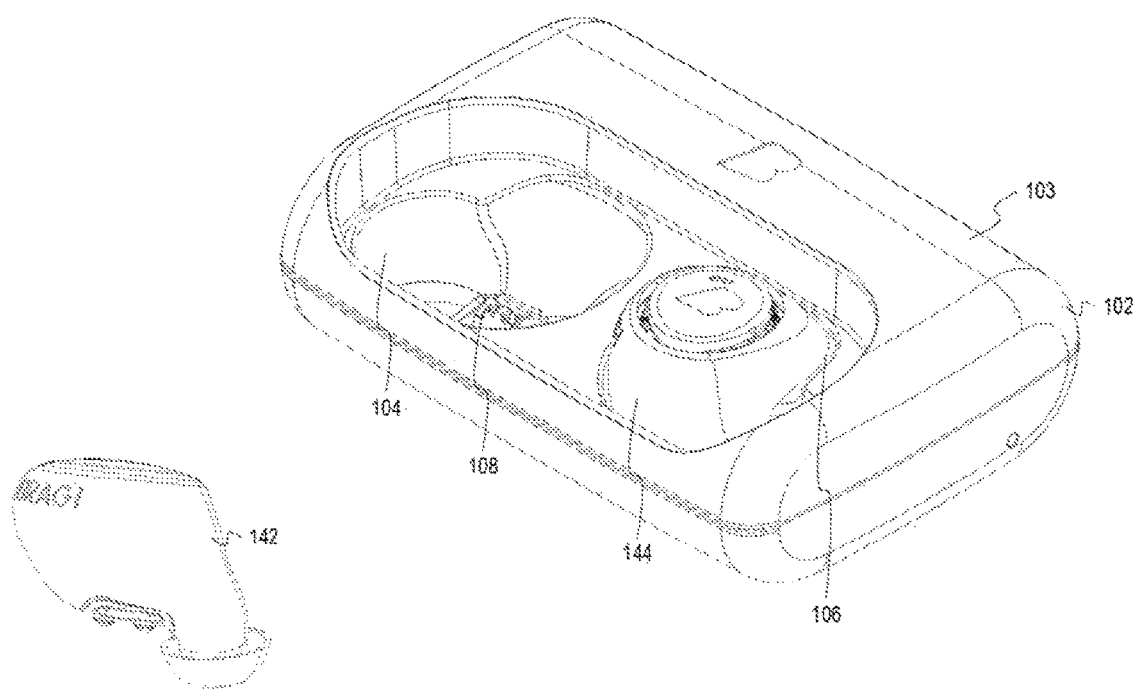
FIG. 1 is a pictorial representation of a smart case and wireless earpieces in accordance with an illustrative embodiment.
Figure 2:
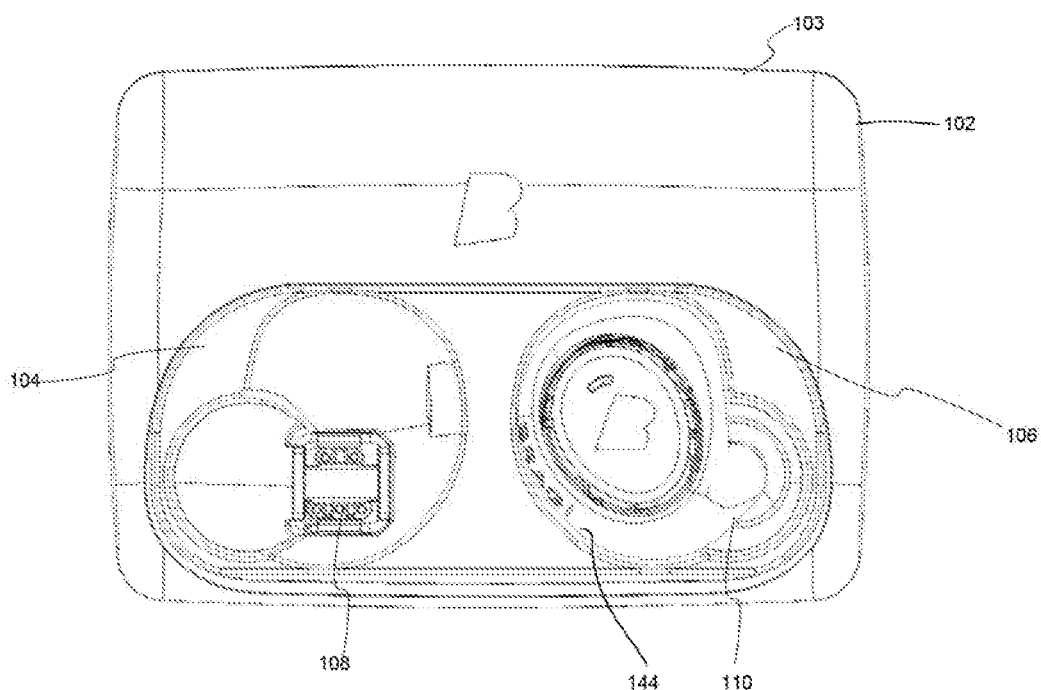
FIG. 2 is a top view of the smart case of FIG. 1 in accordance with an illustrative embodiment.
Figure 3:
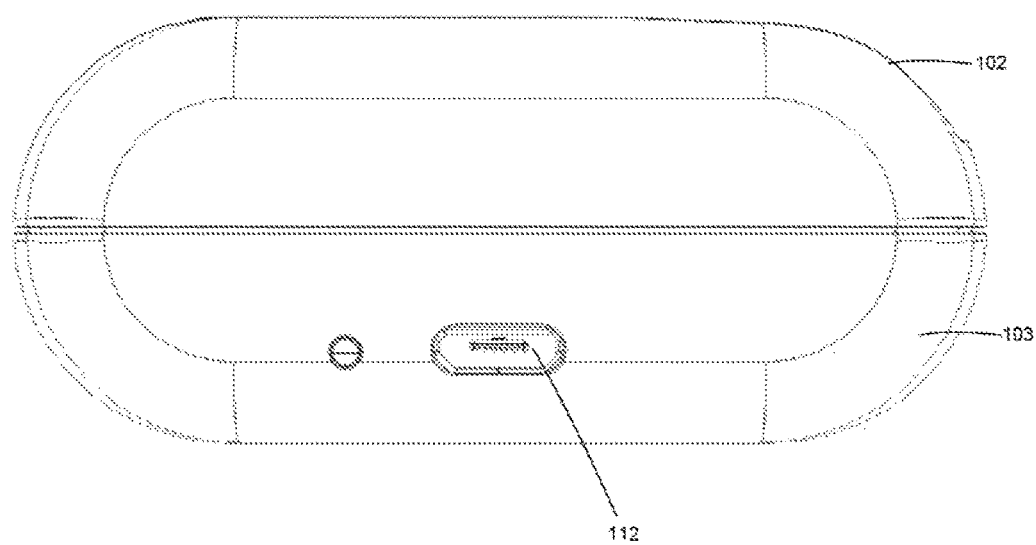
FIG. 3 is a side view of the smart case of FIG. 1 in accordance with an illustrative embodiment.

Turning now to FIGS. 1-3, these figures show a pictorial representation of a smart case 102 and wireless earpieces 142, 144 in accordance with an illustrative embodiment. The smart, case 102 may be an open or enclosed case for securing, charging and managing the wireless earpieces 142, 144, The wireless earpieces 142, 144 may be referred to as a pair (wireless earpieces) or singularly (wireless earpiece). The description may also refer to components and functionality of each of the wireless earpieces 142, 144 collectively or individually. In one embodiment, the wireless earpieces 142, 144 include a set of left and right ear pieces configured to fit into a user's ears. The wireless earpieces 142, 144 may be configured to play music or audio, receive and make phone calls or other communications, determine ambient environmental readings (e.g., temperature, altitude, location, speed, heading, etc.), read user biometrics and actions (e.g., heart rate, motion, sleeping, etc.).

In another embodiment, the wireless earpieces 142, 144 may represent wireless devices that may be ingested or implanted into a user. For example, the smart case 102 may be configured to work with an endoscopic pills, pacemakers, tracking devices, contact lenses, oral implants, bone implants, artificial organs, or so forth. The smart case 102 may act as a logging tool for receiving information, data, or measurements made by the wireless devices. For example, the smart case 102 may be attached to a belt (e.g., belt clip, strap, etc.) or worn by the user to download data from the wireless device(s) in real-time. As a result, the smart case 102 may be utilized to store, charge, and synchronize data for the wireless earpieces 142, 144 in any number of embodiments.

The smart case 102 encloses a battery, and various other circuitry (not shown). The battery of the smart case 102 may be utilized to charge the wireless earpieces 142, 144 through direct contact or wirelessly. As a result, the smart case 102 may act as a custom charger for ensuring the proper power management and functionality of the wireless earpieces 142, 144. For example, the battery of the smart case 102 may be utilized to charge the wireless earpieces 142, 144 any number of times before the smart case 102 and corresponding battery may require charging. In one embodiment, the smart case 102 may include one or more solar panels, or surfaces configured to charge the smart case 102 utilizing ambient or direct sunlight. The smart case 102 ensures that the duty cycle of the wireless earpieces 142, 144 are maximized by properly maintaining power levels. For example, the smart case 102 may keep the wireless earpieces 142, 144 fully charged during a time period of inactivity, such as before being purchased (e.g., on a shelf or as part of inventor) or one purchased.

In one embodiment, the smart case 102 include a frame 103. The frame 103 is a support structure for the components of the smart case 102 and may be formed of a rigid plastic, polymer, or other similar material. However, any number of other suitable materials, such as composites, rubber, wood, metal, or so forth, may be utilized. The frame 103 defines receptacles 104, 106 that are configured to receive the wireless earpieces 142, 144, respectively. In one embodiment, the receptacles 104, 106 are shaped to fit the external size, shape, and configuration of the wireless earpieces 142, 144.

As a result, an interference fit may secure the wireless earpieces 142, 144 within the frame 103 while the smart case 102 is being moved or otherwise utilized. In one embodiment, the smart case 102 may include a hinged, magnetic, sleeve, or snap on lid or cover that may cover the wireless earpieces 142, 144 when positioned within the receptacles 104, 106 of the smart case 102. For example, the cover may make the smart case 102 waterproof and further secure the wireless earpieces 142, 144. In another embodiment, the smart case 102 may also include a removable cover (e.g., neoprene, zip up, snapping, etc). In yet another embodiment, the cover encases a screen, such as a touch screen. The screen may roll, bend or adapt to the shape and configuration of the smart case 102. The touch screen may also be transparent. In one embodiment, the smart case 102 may be hermetically sealed and waterproof when the cover is secured. The smart case 102 may also include one or more speakers for playing music, indicating a status of the wireless earpieces 142, 144 or otherwise communicating information to the user. Likewise, actuators may be utilized to provide tactile feedback to the user. The case may have at least one button 119 or other manual input. The button may be touch sensitive, lighted, or mechanical. There also may be a light such as a LED in that location.

The smart case includes interfaces 108, 110 within the receptacles 104, 106. The interfaces 108, 110 are hardware interfaces for electrically connecting the wireless earpieces 142, 144 to the smart case 102. The interfaces 108, 110 may include any number of contact points, busses, wires, or other physical connectors for interfacing the wireless earpieces 142, 144, with the smart case 102. The interfaces 108, 110 may alternatively include inductive chargers for charging the wireless earpieces 142, 144. In another embodiment, the interfaces 108, 110 may represent male for alternatively female) connectors for interfacing with the wireless earpieces 142, 144, such as micro-USB, or other developing miniature external connectors. The interfaces 108, 110 may be utilized to charge the wireless earpieces 142, 144. The interfaces 108, 110 may also be utilized to synchronize data between the wireless earpieces 142, 144. As previously noted, wireless charging is also contemplated utilizing an inductive charger integrated in the smart case 102 or other charging devices compatible with the wireless earpieces 142, 144.

In one embodiment, the interfaces 108, 110 may power off one or initiate a low power state or mode for one or both of the wireless earpieces 142, 144 when one or more of the wireless ea/pieces 142, 144 are placed within the receptacles 104, 106. For example, a battery of the smart case 102 may power the wireless earpieces 142, 144 when positioned within the smart case 102. As a result, minimal functionality is maintained while power requirements of the wireless earpieces 142, 144 are passed to the smart case 102.

In another embodiment, the wireless earpieces and the smart case 102 may interact to control a device reset function. For example, the wireless earpieces 142, 144 may synchronize captured data with the smart case 102 before moving to a low power mode in anticipation of being charged. A switch may be activated mechanically, magnetically, inductively, electrically, or wirelessly in anticipation of being charged. For example, the smart case 102 may lower the power mode of the wireless earpieces 142, 144 in response to contacts of the wireless earpieces 142, 144 coming in contact with the interfaces 108, 110. For example, the smart case 102 may detect a change in resistance when the wireless earpieces 142, 144 are electrically connected to the interfaces 108, 110 to perform the processes herein described. In another embodiment, each of the interfaces 108, 110 may include a switch that is activated when one of the wireless earpieces 142, 144 is positioned within the receptacles. The interfaces 108, 110 may also include a pin that when depressed or contacted by one of the wireless earpieces 142, 144 turns off the wireless earpieces 142, 144. Control of the wireless earpieces 142, 144 may be controlled by the smart case 102, the wireless earpieces 142, 144 themselves, or may be shared between devices.

The smart case 102 may also include a port 112. The port 112 may be utilized to interface with the smart case 102. For example, the port 112 may be utilized with a connector to charge the battery of the smart case 102. The port 112 may also be utilized to download or upload data stored by the smart case 102 that may have previously been stored in the wireless earpieces 142, 144. The port 112 may be a miniaturized port, such as USB Type C, micro-USB, or other miniaturized port suitable for connecting to another electronic device, such as a wall charger, desktop computer, laptop, or wireless device (e.g., smart phone, tablet, etc.). In another embodiment, the smart case 102 may include a dedicated port for charging, such as for receiving a male direct-current (DC) connector.

In one embodiment, the interfaces, 108, 110 or another portion of the smart case 102 as well as the wireless earpieces 142, 144 may include a near field communication (NFC) chip for communications. For example, NFCs may determine the wireless earpieces 142, 144 are proximate the smart case 102 for performing power management as is herein described. NFC may also be utilized to identify the wireless earpieces 142, 144 associated with a particular smart case 102. In other embodiments, different communications protocols (e.g., Bluetooth, Wi-Fi, etc.), standards, or passive readers radio frequency identification tags, etc.) may be utilized for the wireless earpieces 142, 144 to communicate with the smart case 102. For example, the smart case 102 may power of the wireless earpieces 142, 144 in response to being placed in or near the smart case 102. The smart case 102 may be programmed with a threshold distance (e.g., 10 cm, 1 foot, etc.) to determine when the wireless earpieces 142, 144 are proximate the smart case 102 or may rely on the inherent maximum communications distances of the wireless standard or protocol being utilized (e.g., NFC, RFID, etc.).

In another embodiment, biometric readings, such as heart beat or temperature may be utilized by the wireless earpieces 142, 144 and smart case 102 to alter the power mode or status of the wireless earpieces 142, 144, as well as the smart case 102 (e.g., may be placed in a low power mode). For example, if the wireless earpieces 142, 144 are near the smart case 102 and no heart beat is detected, the smart case 102 may send a command for the wireless earpieces 142, 144 to enter a low power mode or state. In one embodiment, power to onboard sensory arrays may be terminated and only essential functions may remain on. For example, in the low power mode allows charging of the wireless earpieces 142, 144 and/or smart case 102 and uploads/downloads to the wireless earpieces 142, 144 while in the low power mode.

The smart case 102 may also be configured to modify or tune the wireless earpieces 142, 144, in one embodiment, the software utilized by the wireless earpieces 142, 144 may be adjusted based on the characteristics of the user's voice and environment. In another embodiment, the receptacles 104, 106 may utilize a solution, brushes, ultrasonic cleaning or a combination thereof to clean or sanitize all or portions of the wireless earpieces 142, 144 to maintain functionality and optimal performance. For example, a cleaning solution may be periodically added to the smart case 102 for circulation in the receptacles 104, 106 when the wireless earpieces 142, 144 are positioned. In one embodiment, the receptacles 104, 106 may include a locking mechanism and releases for securing the wireless earpieces 142, 144 in place.

Figure 4:
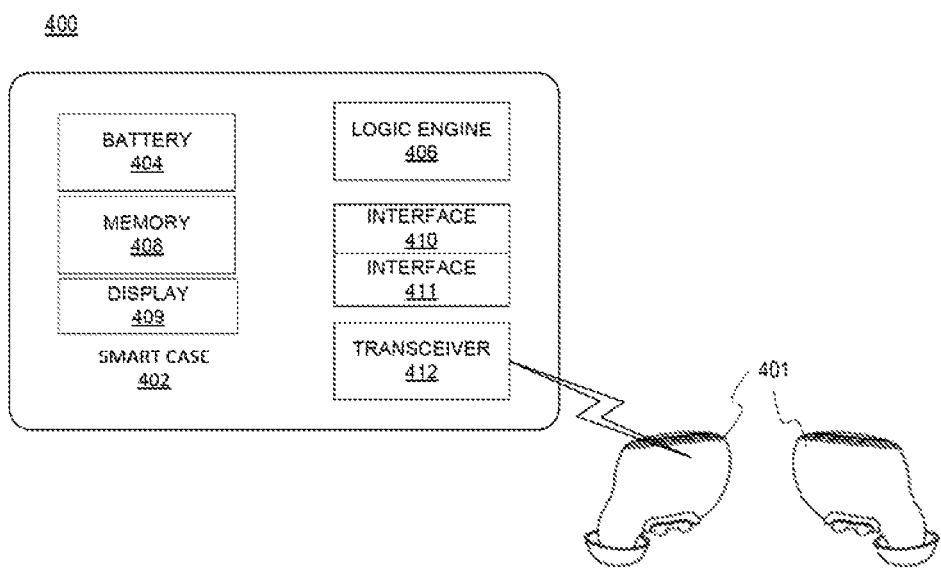
FIG. 4 is a block diagram of a smart case in accordance with an illustrative embodiment.

FIG. 4 is a block diagram of a smart case 402 in accordance with an illustrative embodiment. FIG. 4 shows a wireless environment 400 in which wireless earpieces 401 communicate and are stored within the smart case 402. The smart case 402 may have any number of configurations and include various circuitry, connections, and other components. The smart case 402 is one potential embodiment of the smart case 102 of FIGS. 1-3.

In one embodiment, the smart case 402 may include a battery 404, a logic engine 406, a memory 408, an interface 410, and a transceiver 412. The battery 404 is a power storage device configured to charge the power storage system of the wireless earpieces 101 once or multiple times. In other embodiments, the battery 404 as well as the batteries of the wireless earpieces 401 may represent a fuel cell, thermal electric generator, piezo electric charger, solar charger, ultra-capacitor, or other existing or developing power storage technologies.

In another embodiment, the smart case 402 may inc hide physical buttons or switches, a touch interface or display 409. The touch interface may indicate the status of the smart case 402. For example, a light may indicate the battery status of the smart case 402 as well as connected wireless earpieces 401, download/synchronization status (e.g., synchronizing, complete, last synchronization, etc.), or other similar information.

The battery 404 may itself be charged through an interface 410. The interface 410 is a hardware interface for connecting the smart case to a power supply or other electronic device. The interfaces 410 may be utilized for charging as well as communications with externally connected devices. For example, the interface 410 may represent a mini-USB, micro-USB or other similar miniature standard connector.

The interface 411 is hardware interface for connecting and communicating with the wireless earpieces 401. The interface 411 may include any number of pins, arms, or connectors for electrically interfacing with the contacts or other interface components of the wireless earpieces 401. In another embodiment, the interface 411 may include a wireless inductor for charging the wireless earpieces 401 without a physical connection.

The logic engine 406 is the logic that controls the operation and functionality of the smart case 402. The logic engine 406 may include circuitry, chips, and other digital logic. The logic engine 406 may also include programs, scripts, and instructions that may be implemented to operate the logic engine 406. The logic engine 406 may represent hardware, software, firmware, or any combination thereof. In one embodiment, the logic engine 406 may include one or more processors, such as microprocessors. The logic engine 406 may also represent an application specific integrated circuit (ASIC) or field programmable gate array (FPGA).

For example, a processor included in the logic engine 406 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may also manage transmission and reception of audio and data, GPS information, wireless LAN, GSM, or LTE, SIM or data cards, or so forth. The processor may be a single chip or integrated with other computing or communications elements of the smart case 402.

The memory 408 is a hardware element, device, or recording media configured to store data for subsequent retrieval or access at a later time. The memory 408 may be static or dynamic memory. The memory 408 may include a hard disk, random access memory, SSD, quantum computing drive, cache, removable media drive, mass storage, or configuration suitable as storage for data, instructions, and information. In one embodiment, the memory 408 and the logic engine 406 may be integrated. The memory may use any type of volatile or non-volatile storage techniques and mediums. The memory 408 may store information related to the status of the smart case 402 as well as the wireless earpieces 401.

The transceiver 412 is a component comprising both a transmitter and receiver which may be combined and share common circuitry on a single housing. The transceiver 412 may communicate utilizing Bluetooth, Wi-Fi, ZigBee, ANT+, near field communications, wireless USB, infrared, mobile body area networks, ultra-wideband communications, cellular, or other suitable radio frequency standards, networks, protocols, or communications. The transceiver 412 may also be a hybrid transceiver that supports a number of different communications. For example, the transceiver 412 may communicate with the wireless earpieces 401 utilizing NFC or various Bluetooth communications.

The components of the smart case 402 may be a multilayer printed circuit board (PCB) electrically connected utilizing any number of wires, contact points, leads, busses, wireless interfaces, or so forth. In addition, the smart case 402 may include any number of computing and communications components, devices or elements which may include busses, motherboards, circuits, ports, interfaces, cards, converters, adapters, connections, transceivers, displays, antennas, and other similar components.

Although not specifically shown, the smart case 402 may communicate with any number of other networks or devices to log information. For example, the smart case 402 may utilize an Internet connection (e.g., through a user Wi-Fi network information provided by a user) to access a portal to store information related to the data acquired by the wireless earpieces 401 and/or smart case 402. The portal may be a web site that functions as a central point of access to information on the Internet or an intranet. The portal may be accessed from any computing or communications system or device enabled to communicate through a network connection. For example, information accessed by the portal may be stored on a server and an associated database. In another embodiment, the smart case 402 may include a port for receiving a data or communication card (e.g., SIM card, micro SD card, etc.). The data or communications cards may be utilized to store information and may be utilized for data communications. For example, the smart case 402 may include the communication components and functionality of a wireless device, such as a cell phone for utilization with one or more communications service providers.

Figure 5:
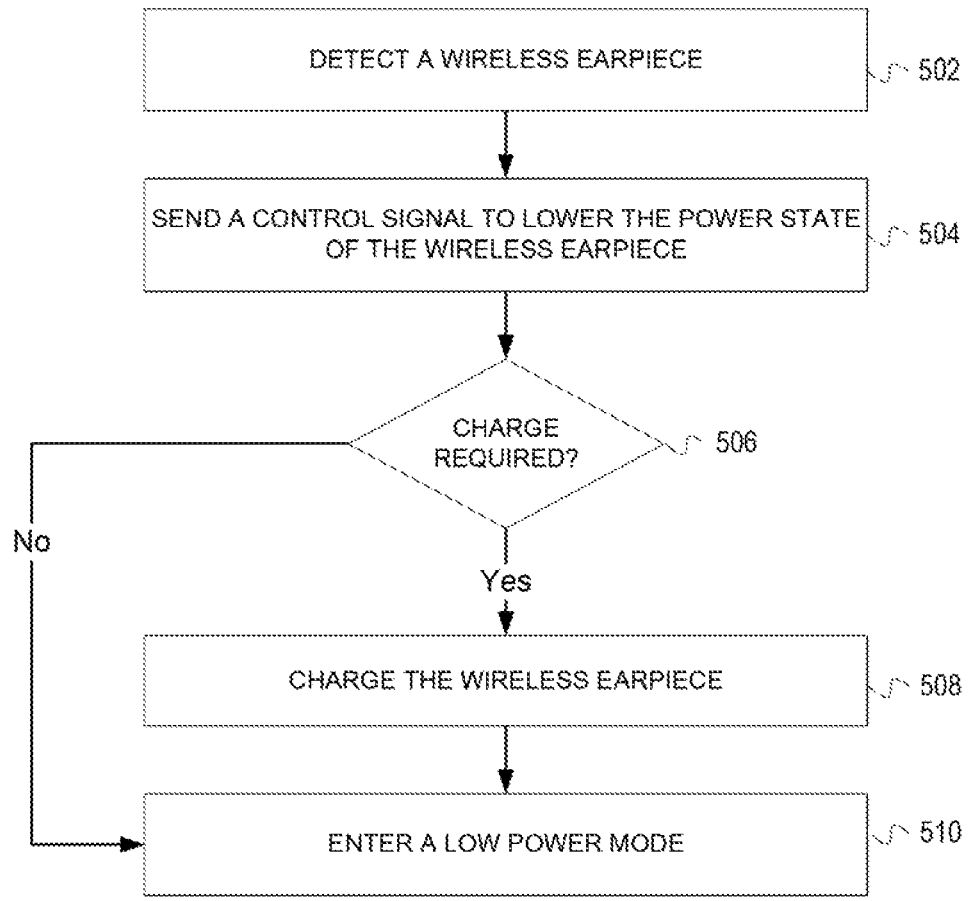
FIG. 5 is a flowchart of a process for utilizing a smart case with a wireless earpiece in accordance with an illustrative embodiment.

FIG. 5 is a flowchart of a process for utilizing a smart case with wireless earpieces in accordance with an illustrative embodiment. In one embodiment, the processes of FIG. 5 may be implemented by a smart case interfacing or communicating with wireless earpieces. The smart case may communicate or interface with the wireless earpieces individually or as a unit. For example, control signals may be sent individually from the smart case to each of the wireless earpieces. In another example, the smart case may only communicate with a master earpiece with subsequent control signals and commands relayed by the master wireless earpiece to the slave or subservient wireless earpiece.

The process may begin by detecting a wireless earpiece (step 502). In one embodiment, the wireless earpiece(s) may be detected in response to physical interaction between the wireless earpiece and the smart case. The wireless earpiece may connect to or link with the smart case utilizing points of contact male and female connectors, or so forth. The wireless earpieces may utilize contacts to preserve the waterproof nature of the wireless earpieces.

In another embodiment, the wireless earpiece may be detected wirelessly. For example, the wireless earpiece may be detected by the smart case utilizing a NFC radio frequency identification tag, or other short range communications signal. In one embodiment, the wireless earpiece may be required to be within a threshold distance (e.g., 10 feet, 10 cm, etc.) to be detected by the smart case. Once the wireless earpiece is proximate the smart case, the smart case may begin to implement any number of actions for the wireless earpiece as well as the smart case.

Next, the smart case sends a control signal to lower the power mode of the wireless earpiece (step 504). In one embodiment, the smart case may lower the power mode of the wireless earpiece to preserve battery life when in close proximity to one another. The smart case may alternatively place the wireless earpiece in a reduced power state, sleep, or other mode. The power mode may relate to the components that are operative. For example, in a low power mode, the wireless earpieces may only implement charging and data synchronization operations. The command may be sent individually or collectively to each device making up the wireless earpiece pair. In one embodiment, by lowering the power mode of the wireless earpiece, the wireless earpiece is prepared to be charged. In another embodiment, the wireless earpieces may lower the power mode in response to detecting proximity to the smart case or to each other (e.g., threshold distance of three inches or less).

Next, the smart case determines whether a charge is required for the wireless earpiece (step 506). The determination of step 506 may be based on predetermined thresholds for the battery status. The battery status may be determined utilizing the interface or communications between the wireless earpiece and the smart case. In one embodiment, the smart case may automatically charge the wireless earpiece in response to determining the battery status is anything less than 95%. The smart case may also charge the wireless earpieces in response to a designated time period elapsing, such as two days to ensure the batteries are fully functional and kept at full capacity.

In response to determining a charge is required, the smart case charges the wireless earpiece (step 506). The smart case utilizes a larger battery to charge the onboard battery of the wireless earpiece. Although referred to as batteries, the batteries each of smart case and wireless earpiece may represent ultra-capacitors, fuel cell, heat pump power generators, or other power storage or generation devices.

In another embodiment, the wireless earpiece may download or synchronize data with the smart case. The data may include biometric information (e.g., pulse rate, oxygenation, distance travelled, calories burned, etc), exercise information, commands received, and other data logged by sensors (e.g., heart rate monitor, pulse oximeter, accelerometers, gyroscopes, etc.) of the wireless earpiece or otherwise determined. The data may represent user data or data about the performance of the wireless earpieces. In one embodiment, only new data gathered by the wireless earpieces may be synchronized to the smart case. The data may also include medical information, such as blood measurements voice data (e.g., jitter/shimmer rates), temperature, chemical levels (e.g., sodium, glucose, etc.), ambient environment information (e.g., temperature, altitude, barometric readings, speed, etc.) captured audio or video, or so forth.

Next, the smart case enters a low power mode (step 510). In the low power mode, the smart case may utilize minimal power to maintain functionality and alert status of the smart case. For example, the smart case may be configured to communicate with one or more other external devices, such as another pair of wireless earpieces, mobile devices, personal computers, routers, or so forth. For example, location data of the user may be shared with other external devices and corresponding applications. In the low power mode the smart case minimizes power utilization while still exerting full control over the power utilization, charging, and synchronization of the wireless earpieces. The low power mode maintains the earpieces with minimal functionality to charge and synchronize data as well as other designated functions that may be set by user preferences, default, program updates from a central location, or so forth. As a result, the battery of the wireless earpieces may be maintained in an optimal state. In addition, the transition from the low power mode to a high power mode may be implemented upon detecting the wireless earpieces have been removed from the smart case.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, stibstitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing wireless earpieces utilizing a smart case, comprising:

detecting the wireless earpieces proximate the smart case, the smart case comprising a frame securing the wireless earpieces, a logic engine controlling the functionality of the smart case, a first interface electrically interfacing the wireless earpieces with the smart case, a battery charging the wireless earpieces in response to contact with the first interface, and a second interface charging the battery;
lowering power utilized by the wireless earpieces for a low power mode in response to detecting the wireless earpieces proximate the smart case; and
charging the wireless earpieces utilizing the battery of the smart case in response to determining the wireless earpieces require charging.

2. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case;
charging the wireless earpieces utilizing the battery of the smart case in response to determining the wireless earpieces require charging; and
recharging the wireless earpieces in response to the wireless earpieces remaining in the smart case for a threshold time period to condition and manage battery life of the batteries of the wireless earpieces.

3. The method of claim 1, wherein the smart case includes a display for displaying information corresponding to the smart case and the wireless earpieces.

4. The method of claim 3, wherein the information includes at least a battery status of the smart case and the wireless earpieces.

5. The method of claim 1, wherein the wireless earpieces are charged and synchronize data in the low power mode.

6. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case;
charging the wireless earpieces utilizing the battery of the smart case in response to determining the wireless earpieces require charging; and
downloading data gathered by sensors of the wireless earpieces for storage in a memory of the smart case.

7. The method of claim 1, further comprising:
the smart case entering a low power mode in response to not detecting the wireless earpieces proximate the smart case.

8. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case;
charging the wireless earpieces utilizing the battery of the smart case in response to determining the wireless earpieces require charging; and
synchronizing data gathered by the wireless earpieces with a memory of the smart case.

9. The method of claim 1, wherein the charging is performed utilizing inductive charging.

10. The method of claim 8, further comprising:
communicating the data gathered by the wireless earpieces from the smart case to an external device in response to connecting the external device to the smart case.

11. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case; and
charging the wireless earpieces utilizing the battery of the smart case in response to determining the wireless earpieces require charging;
wherein the detecting is performed by a near field communication between the smart case and the wireless earpieces.

12. The method of claim 1, wherein the detecting further comprises:
sensing an electrical interface between the wireless earpieces and the smart case.

13. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case; and
charging the wireless earpieces utilizing the battery of the smart case in response to determining the wireless earpieces require charging;
wherein the charging further comprises:
charging the wireless earpieces to a threshold level.

14. The method of claim 1, further comprising:
providing at least a visual indicator in response to the battery of the smart case dropping below a minimum threshold value.

15. A method for managing wireless earpieces utilizing a smart case, comprising:
detecting the wireless earpieces proximate the smart case;
lowering power utilized by the wireless earpieces for a low power mode in response to detecting the wireless earpieces proximate the smart case; and
charging the wireless earpieces utilizing the battery of the smart case in response to determining the wireless earpieces require charging; and
modifying the performance of the wireless earpieces utilizing the smart case.

16. A smart case for wireless earpieces, comprising:
a frame securing the wireless earpieces;
a logic engine controlling the functionality of the smart case;
a first interface electrically interfacing the wireless earpieces with the smart case;
a battery controlled by the logic engine charging the wireless earpieces in response to contact with the first interface; and
a second interface charging the battery, wherein the logic engine commands the wireless earpieces to enter a low power mode in response to the wireless earpieces contacting the first interface.

17. The smart case of claim 16, further comprising:
a transceiver communicating with the wireless earpieces.

18. The smart case of claim 16, wherein the smart case includes a display for displaying information corresponding to the smart case and the wireless earpieces, wherein the information includes at least a battery status of the smart case and the wireless earpieces.

19. The smart case of claim 16, wherein the second interface is an inductive charger.

* * * * *